(12) United States Patent
Khan et al.

(10) Patent No.: US 7,159,096 B2
(45) Date of Patent: Jan. 2, 2007

(54) METHOD AND APPARATUS TO PERFORM MEMORY MANAGEMENT

(75) Inventors: Moinul H. Khan, Austin, TX (US);
Priya N. Vaidya, Shrewsbury, MA (US)

(73) Assignee: Marvell International Ltd., Hamilton (BM)

(*) Notice: Subject to any disclaimer, the term of this patent is extended or adjusted under 35 U.S.C. 154(b) by 294 days.

(21) Appl. No.: 10/816,268

(22) Filed: Mar. 31, 2004

(65) Prior Publication Data

US 2005/0223189 A1    Oct. 6, 2005

(51) Int. Cl.
*G06F 12/08* (2006.01)
*G06F 12/06* (2006.01)

(52) U.S. Cl. .................. 711/206; 711/202; 711/203
(58) Field of Classification Search ............. 711/206, 711/203, 202
See application file for complete search history.

(56) References Cited

U.S. PATENT DOCUMENTS

| | | | |
|---|---|---|---|
| 5,928,321 A * | 7/1999 | Ozcelik et al. ............. 718/1 |
| 6,421,711 B1 * | 7/2002 | Blumenau et al. .......... 709/213 |
| 2001/0004595 A1 * | 6/2001 | Dent ....................... 455/435 |

* cited by examiner

*Primary Examiner*—Matthew Kim
*Assistant Examiner*—Lev Iwashko

(57) ABSTRACT

A method and apparatus to perform memory management are described.

22 Claims, 4 Drawing Sheets

METHOD AND APPARATUS TO PERFORM MEMORY MANAGEMENT

BACKGROUND

A wireless communication system can use memory devices of different types. The data flow through the device may be influenced by which memory device is used by a particular application process or computational element. Consequently, performance of the device may be enhanced by more efficient memory management. Accordingly, there may be need for improvements in such techniques in a device or network.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Numerous specific details may be set forth herein to provide a thorough understanding of the embodiments. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

The embodiments may be described in terms of one or more modules. Although an embodiment has been described in terms of "modules" to facilitate description, one or more circuits, components, registers, processors, software subroutines, or any combination thereof could be substituted for one, several, or all of the modules. The embodiments are not limited in this context.

Figure 1:
FIG. 1 illustrates a communication system suitable for practicing one embodiment.

Referring now in detail to the drawings wherein like parts are designated by like reference numerals throughout, there is illustrated in FIG. 1 a system suitable for practicing one embodiment. FIG. 1 is a block diagram of a system 100. System 100 may comprise a plurality of nodes. The term "node" as used herein may refer to an element, module, component, board, device or system that may process a signal representing information. The signal may be, for example, an electrical signal, optical signal, acoustical signal, chemical signal, and so forth. The embodiments are not limited in this context.

In one embodiment, a node may be configured to communicate information between various nodes of system 100. For example, one type of information may comprise "media information." Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Another type of information may comprise "control information." Control information may refer to any data representing commands, instructions or control words meant for an automated system. For example, control information may be used to route media information through a system, or instruct a node to process the media information in a predetermined manner. The embodiments are not limited in this context.

In one embodiment, the nodes may communicate the information in accordance with one or more protocols. The term "protocol" as used herein may refer to a set of instructions to control how the information is communicated over the communications medium. Further, the protocol may be defined by one or more protocol standards, such as the standards promulgated by the Internet Engineering Task Force (IETF), International Telecommunications Union (ITU), and so forth.

In one embodiment, one or more communications mediums may connect the nodes. The term "communications medium" as used herein may refer to any medium capable of carrying information signals. Examples of communications mediums may include metal leads, semiconductor material, twisted-pair wire, co-axial cable, fiber optic, radio frequencies (RF) and so forth. The terms "connection" or "interconnection," and variations thereof, in this context may refer to physical connections and/or logical connections.

In one embodiment, for example, the nodes may be connected by communications mediums comprising RF spectrum for a wireless network, such as a cellular or mobile system. In this case, one or more nodes shown in system 100 may further comprise the devices and interfaces to convert the packet signals carried from a wired communications medium to RF signals. Examples of such devices and interfaces may include omni-directional antennas and wireless RF transceivers. The embodiments are not limited in this context.

As shown in FIG. 1, system 100 may comprise a wireless communication system having a wireless node 102 and a wireless node 104. Wireless nodes 102 and 104 may comprise nodes configured to communicate information over a wireless communication medium, such as RF spectrum. Wireless nodes 102 and 104 may comprise any wireless device or system, such as mobile or cellular telephone, a computer equipped with a wireless access card or modem, a handheld client device such as a wireless personal digital assistant (PDA), a wireless access point, a base station, a mobile subscriber center, and so forth. In one embodiment, for example, wireless node 102 and/or wireless node 104 may comprise wireless devices developed in accordance with the Personal Internet Client Architecture (PCA) by Intel® Corporation. Although FIG. 1 shows a limited number of nodes, it can be appreciated that any number of nodes may be used in system 100. Further, although the embodiments may be illustrated in the context of a wireless system, the principles discussed herein may also be implemented in a wired communication system as well. The embodiments are not limited in this context.

Figure 2:
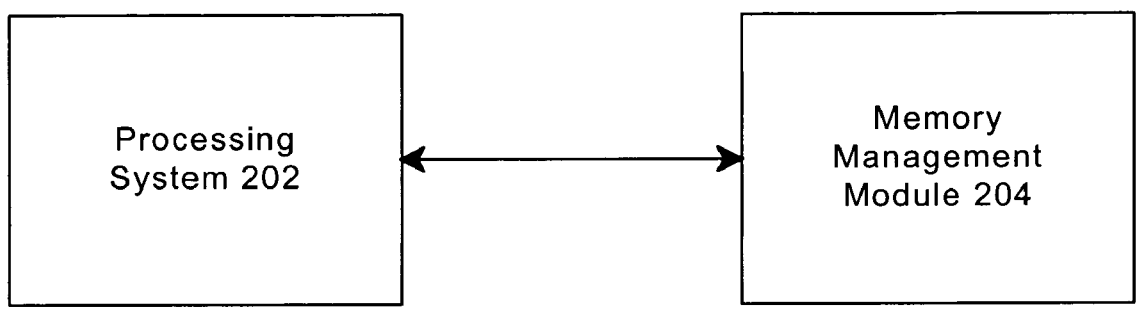
FIG. 2 illustrates a first block diagram of a node in a communication system in accordance with one embodiment.

FIG. 2 illustrates a first block diagram of a node in a communication system in accordance with one embodiment. FIG. 2 may illustrate a system 200. System 200 may be implemented as part of, for example, wireless node 102 and/or wireless node 104. As shown in FIG. 2, system 200 may comprise a processing system 202 and a memory management module 204. Although FIG. 2 shows a limited number of modules, it can be appreciated that any number of modules may be used in system 200.

In one embodiment, system 200 may comprise processing system 202. Processing system 202 may comprise any processing system having a processor and a plurality of memory devices. Processing system 200 may operate to process program instructions, which may include storing and retrieving data objects in and out of one or more of the memory devices.

In one embodiment, system 200 may comprise memory management module 204 in communication with processing system 202. Memory management module 204 may perform memory management operations for system 200. More particularly, memory management module 204 may manage how the data objects are stored in the memory devices.

In general operation, memory management module 204 may be configured to manage assigning a plurality of agents to use a first set of memory devices from the plurality of memory devices of processing system 202. The assignment may be performed using an assignment cost value. The assignment cost value may be a measure of the bandwidth needed for the assignment. The plurality of agents may be reassigned to a second set of memory devices from the plurality of memory devices of processing system 202. Memory management module 204 may perform the reassignment to lower the assignment cost value.

Figure 3:
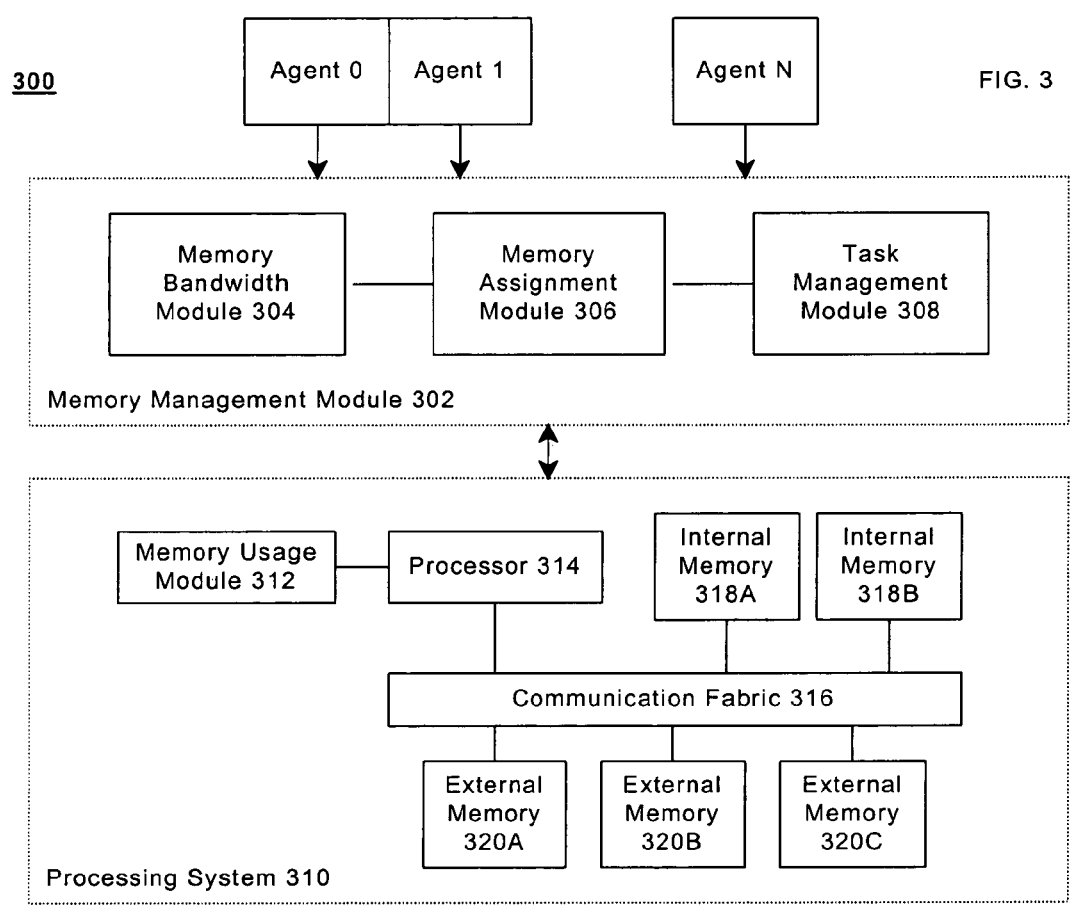
FIG. 3 illustrates a second block diagram of a node in a communication system in accordance with one embodiment.

FIG. 3 illustrates a second block diagram of a node in a communication system in accordance with one embodiment. FIG. 3 illustrates a system 300. System 300 may be a more detailed representation of, for example, system 200 described with reference to FIG. 2. As shown in FIG. 3, system 300 may comprise agents 0–N, a memory management module 302, and a processing system 304. Although FIG. 3 shows a limited number of elements, it can be appreciated that any number of elements may be used in system 300.

In one embodiment, system 300 may comprise agents 0–N. An agent may comprise any process or entity that accesses memory. Examples of an agent may include logical processes in the processor, application software, hardware components such as a Liquid Crystal Display (LCD), video codec, audio codec, graphics controllers, and so forth. The embodiments are not limited in this context.

In one embodiment, system 300 may comprise processing system 310. Processing system 310 may be representative of, for example, processing system 202. As shown in FIG. 3, processing system 310 may comprise a memory usage module 312, a processor 314, internal memory 318A–B, and external memory 320A–C, all connected via a communications fabric 316. Although processing system 310 shows a limited number of elements, it can be appreciated that any number of elements may be used in processing system 310.

In one embodiment, processing system 310 may comprise processor 314. Processor 314 may comprise any type of processor capable of providing the speed and functionality required by the embodiments of the invention. For example, processor 314 could be a processor made by Intel Corporation and others. Processor 314 may also comprise a digital signal processor (DSP) and accompanying architecture. Processor 314 may further comprise a dedicated processor such as a network processor, embedded processor, micro-controller, controller, input/output (I/O) processor (IOP), and so forth. The embodiments are not limited in this context.

In one embodiment, processing system 310 may comprise internal memory 318A–B and external memory 320A–C. The term "internal memory" as used herein may refer to memory devices that are on the same chip as processor 314. The term "external memory" as used herein may refer to memory devices that are not on the same chip as processor 314. Internal memory 318 and external memory 320 may both comprise a machine-readable medium and accompanying memory controllers or interfaces. The machine-readable medium may include any medium capable of storing instructions adapted to be executed by processor 314 and/or accompanying data objects for an agent, such as agents 0–N. Some examples of such media include, but are not limited to, read-only memory (ROM), random-access memory (RAM), programmable ROM, erasable programmable ROM, electronically erasable programmable ROM, dynamic RAM, double data rate (DDR) memory, dynamic RAM (DRAM), synchronous DRAM (SDRAM), embedded flash memory, and any other media that may store digital information. Further, processing system 310 may also contain various combinations of machine-readable storage devices through various I/O controllers, which are accessible by processor 314 and which are capable of storing a combination of computer program instructions and data objects.

In one embodiment, internal memory 318A–B and external memory 320A–C may be configured in a hierarchical memory sub-system architecture. Characteristics of these memory devices may be non-uniform in terms of latency, throughput, power consumption, memory space, and so forth. For example, internal memory may have less latency but limited memory space as compared to external memory. These variations can be due to the nature of the memory devices or communication fabric 316 used to communicate with the memory devices. Processor 314 and other active processing units in the system may read and write data objects from and to the memory space provided by the various memory devices, under the management of memory management module 302. Although a limited number of internal and external memory devices are shown as part of processing system 310, it may be appreciated that any type and number of memory devices may be used with processing system 310 and still fall within the scope of the embodiments.

In one embodiment, processing system 310 may comprise communication fabric 316. Communication fabric 316 may comprise any communication fabric suitable for communicating program instructions and data objects between processor 314, internal memory 318, and external memory 320. For example, communication fabric 316 may comprise a communications backplane, bus architecture, a switching fabric, and so forth. The embodiments are not limited in this context.

In one embodiment, processing system 310 may comprise memory usage module 312 in communication with processor 314. Memory usage module 312 may monitor and measure use of the memory devices for processing system 310. Memory usage module 312 may monitor use of the memory space for the memory devices. The memory space may be divided into a plurality of memory pages. A page of memory may comprise a predetermined block of physical addresses. The size of the block may vary according to implementation. An example of a page size may be 4 kilobytes of memory. Memory usage module 312 may have various counters to measure the number of times a page of memory has been accessed. Examples of counters may include a page read counter, page write counter, and so forth. The type and number of counters maintained by memory usage module 312 may vary according to implementation and available resources for processing system 310. Memory usage module 312 may pass memory usage information to various system components, one of which may include memory bandwidth module 304 as discussed in more detail below.

In one embodiment, it may be appreciated that memory usage module 312 may also be implemented as part of memory management module 302 rather than processing system 310. In addition, the operations of memory usage module 312 may be performed by another entity, such as an application program interface (API) for an operating system, application or agent. The embodiments are not limited in this context.

In one embodiment, system 300 may comprise memory management module 302. Memory management module 302 may be representative of, for example, memory management module 204. Memory management module 302 may comprise a memory bandwidth module 304, a memory assignment module 306, and a task management module 308. Although memory management module 302 shows a limited number of elements, it can be appreciated that any number of elements may be used in memory management module 302.

In one embodiment, memory management module 302 may perform memory management operations for system 300. More particularly, memory management module 302 may manage how the data objects are stored in the memory devices. The placement of the data objects in the available memory space may influence the data flow of system 300. This may in turn affect the overall performance and power achieved from system 300. Memory management module 302 may monitor the data flow of processing system 310 and attempt to improve data flow. The size of the data objects and nature of access to these objects may change dynamically in system 300 for a number of reasons, such as changes in the use-case, wireless link quality, available power, and so forth. Memory management module 302 attempts to optimize the data flow to accommodate the dynamic changes in system 300.

In one embodiment, memory management module 302 may comprise task management module 308. Task management module 308 may operate to retrieve a set of virtual addresses used by an agent, such as agent 0–N. An agent is typically assigned a block of virtual addresses that are used for the data objects embedded within the agent. The virtual addresses are logical addresses which are typically independent of the physical addresses of the memory devices implemented for a given device. In this manner, the virtual addresses permit an agent to use different types of memory devices, thereby enhancing the portability and robustness of the agent.

In one embodiment, memory management module 302 may comprise a memory assignment module 306 in communication with task management module 308. Memory assignment module 306 may operate to assign the virtual addresses retrieved by task management module 308 to a first set of physical addresses for a plurality of memory devices, such as internal memory 318 and/or external memory 320. Internal memory 318 and external memory 320 may comprise the total available memory space available to processing system 310. Memory assignment module 306 may assign the virtual addresses retrieved from an agent to physical addresses from the total available memory space. The physical addresses, however, may not necessarily be contiguous blocks of memory, and therefore an agent may be assigned use of several different memory devices and/or types of memory devices. Memory assignment module 306 also maintains a list of current memory assignments. The memory assignments may be generated by memory bandwidth module 304, for example.

In one embodiment, memory management module 302 may comprise memory bandwidth module 304 in communication with memory assignment module 306. Memory bandwidth module 304 may determine memory assignments for a given agent. In one embodiment, for example, memory bandwidth module 304 may operate to generate an assignment cost value for the assignment performed by memory assignment module 304. In an attempt to improve the overall data flow for system 300, memory bandwidth manager 304 may monitor the memory assignments for system 300. Memory bandwidth manager 304 may attempt to measure the performance of the memory assignments in terms of individual memory assignments for a particular agent, and also in terms of the collective memory assignments, to improve bandwidth efficiency for system 300. Memory bandwidth manager 304 may use the measurements to improve data flow for system 300 by reassigning one or more of the memory assignments. Memory bandwidth manager 304 may perform the reassignment operations periodically or at discrete instances, such as when there is a transition in the user profile or use-case of the devices. A transition of use-case may comprise, for example, when a user changes a telephone call between two parties into a conference call.

The operations of the above systems may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, although the given programming logic may be described herein as being implemented in the above-referenced modules, it can be appreciated that the programming logic may be implemented anywhere within the system and still fall within the scope of the embodiments.

Figure 4:
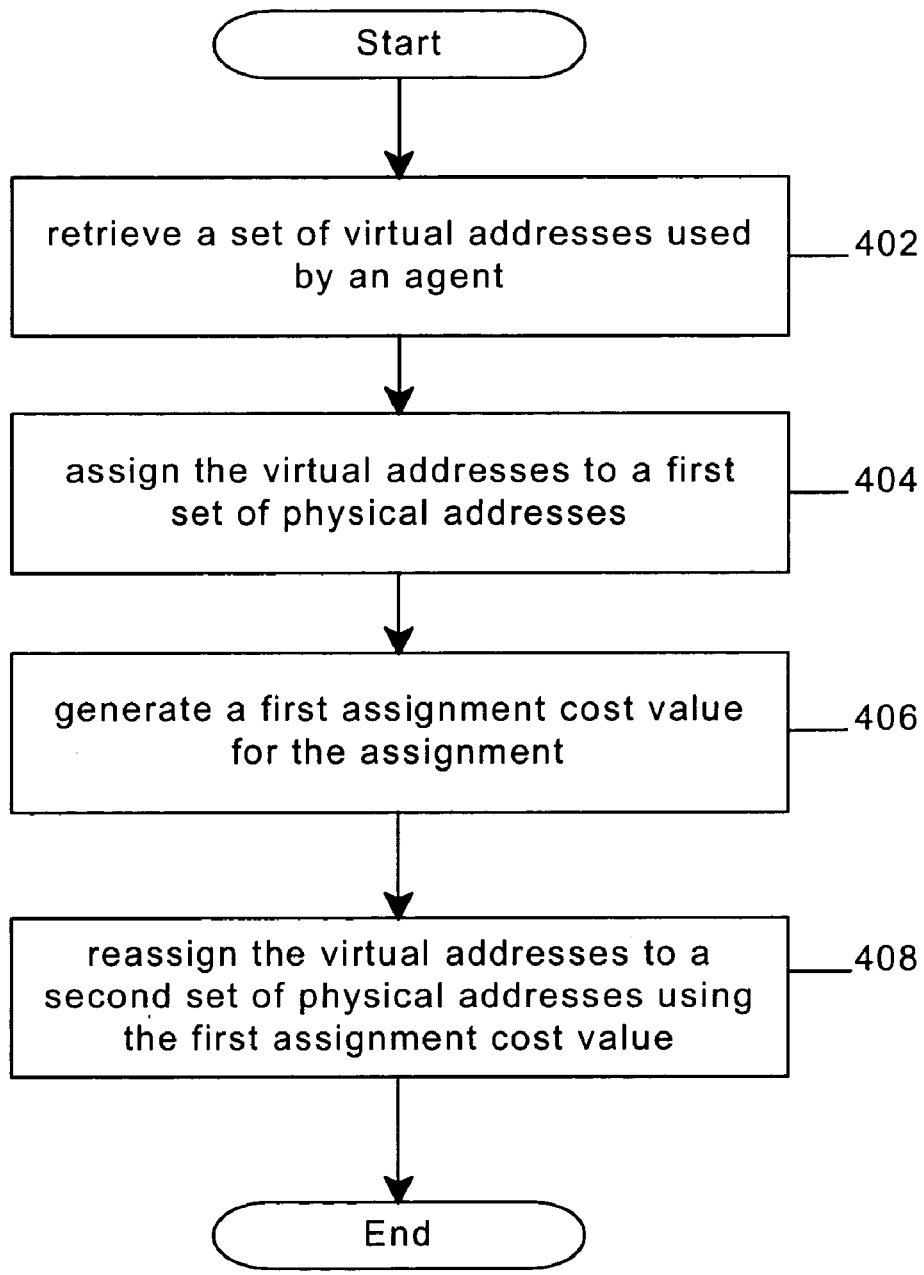
FIG. 4 is a block flow diagram of the programming logic performed by a memory management module in accordance with one embodiment.

FIG. 4 illustrates a programming logic for a memory management module in accordance with one embodiment. FIG. 4 illustrates a programming logic 400 that may be representative of the operations executed by a memory management module, such as memory management module 302, for example. As shown in programming logic 400, a set of virtual addresses used by an agent may be retrieved at block 402. The virtual addresses may be assigned to a first set of physical addresses at block 404. The physical addresses correspond to a plurality of memory types. A first assignment cost value may be generated for the assignment at block 406. The virtual addresses may be reassigned to a second set of physical addresses using the first assignment cost value at block 408.

In one embodiment, the first assignment cost value may be generated at block 406 by identifying a number of data objects associated with the agent. A read rate value and a write rate value may be received for the data objects. Each data object may be mapped to a memory type to form a first memory map. A memory read traffic value may be determined using the read rate value and first memory map. A write traffic value may be determined using the write rate value and first memory map. A read cost value and a write cost value may be determined for the memory types. An assignment read cost value may be determined by multiplying the memory read traffic value with the read cost value. An assignment write cost value may be determined by multiplying the memory write traffic value with the write cost value. The first assignment cost value may be generated by summing the assignment read cost value with the assignment write cost value.

In one embodiment, the read cost value and write cost value may be determined by identifying at least one cost factor associated with each memory type. The read cost value and write cost value may be determined using the at least one cost factor.

In one embodiment, the read rate value and write rate value for the data objects may be received by receiving a read page count value and a write page count value. The read page count value and write page count value may be received from, for example, memory usage module 312. The read rate value and write rate value may be determined using the read page count value and write page count value, respectively.

In one embodiment, the virtual addresses may be reassigned to a new set of physical addresses. For example, a second assignment cost value may be generated for the second set of physical addresses. The second assignment cost value may be compared with the first assignment cost value. The virtual addresses may be reassigned to the second set of physical addresses if the second assignment cost value is lower than the first assignment cost value. Once reassigned, the data objects for the agent may be moved from the first set of physical addresses to the second set of physical addresses, and the memory assignment needs to be updated for memory mapping module 306.

In one embodiment, the second assignment cost value may be generated in a manner similar to the first assignment cost value. For example, each data object for the agent may be remapped to a memory type to form a second memory map. A new memory read traffic value may be determined using the read rate and second memory map. A new write traffic value may be determined using the write rate and second memory map. A new assignment read cost value may be determined by multiplying the new memory read traffic value with the read cost value. A new assignment write cost value may be determined by multiplying the new memory write traffic value with the write cost value. The second assignment cost value may be generated by summing the new assignment read cost value with the new assignment write cost value.

In one embodiment, the mapping and remapping operations may be performed by determining a set of mapping constraints for the mapping. The mapping constraints may vary according to implementation. Examples of mapping constraints may include that the set of physical addresses must fit the physical memory of the memory devices, maximizing use of physical memory for a particular memory device, ensuring that all data objects are mapped exhaustively meaning that all memory will be allocated, and so forth. Each data object may be mapped to a memory type to form a memory map in accordance with the mapping constraints.

The operation of the above described systems and associated programming logic may be better understood by way of example. Assume that each process running on processor 314 and other processing element as a part of a data-flow, e.g., a source or a sink. Memory management module 302 performs operations to reduce the cost of communication for the data flow through a device, such as wireless nodes 102 and 104. Memory management module 302 may accomplish this by transforming the memory management problem into a linear programming solution. A linear program (LP) is a problem that can be expressed as follows:

Minimize cx

Subject to $Ax=b$, $x>=0$ where x is the vector of variables to be solved for, A is a matrix of known coefficients, and c and b are vectors of known coefficients. The expression "cx" may be referred to as the objective function, and the equations such as "$Ax=b$" may be referred to as constraints. These entities should have consistent dimensions, and transpose symbols may also be added. The matrix A is generally not square, hence an LP problem may not be solved by inverting A. Rather, A typically has more columns than rows, and therefore $Ax=b$ is likely to be under-determined, leaving relatively great latitude in the choice of x with which to minimize cx.

There may be many solutions for an LP problem. For a low number of control parameters, a solution to such a constrained optimization problem can be reached relatively quickly. Thus by posing the dynamic memory allocation scheme as a constrained minimization problem, memory management module 302 can be configured to periodically solve the problem.

A dynamic memory allocation scheme suitable for use by memory management module 302 may be derived as follows. Assume there are multiple agents in system 300. For an agent Pi let there be Di number of data objects. The agent Pi has a read rate and a write rate for these data objects that may be represented as follows:

$$RR_{P_i} = [r_1 \ldots r_{D_i}]_{D_i}$$

$$WR_{P_i} = [w_1 \ldots w_{D_i}]_{D_i}$$

The read rate and write rate values may be represented as number of reads or writes, respectively, in a unit time.

Further assume there are N number of memories in the system. The memory mapping for the data objects can be given as follows:

$$MM_P = \begin{matrix} D_1 \\ \vdots \\ D_i \end{matrix} \begin{bmatrix} MM_{11} \ldots \\ \vdots \\ \ldots MM_{D_iN} \end{bmatrix}$$

where element MM(i,j) is set to 1 if data object i is mapped to the memory type j.

It is worthy to note that the number of agents for a given system may be limited. For example, wireless node 102 may have agents to perform audio encoding/decoding, video encoding/decoding, displaying information on a LCD, communications interface, and core operations. In this example, the number of agents for wireless node 102 may be limited to five agents. In addition, the data objects being accessed by these agents may also be limited. For example, the data objects for an LCD may be limited to a back-plane data object and two overlay data objects.

Referring again to our example, the memory read traffic (MRT) and memory write traffic (MRT) for each agent may be represented as follows:

$$MRT_{P_i} = RR_{P_i} \cdot MM_{P_i}$$

$$MWT_{P_i} = WR_{P_i} \cdot MM_{P_i}$$

where MRT and MWT are vectors of N tuple long. MRT and MWT may represent what is the transaction demand for each agent. The information to generate these numbers can be collected through memory usage module 312 or via some operating system provided API for an application. The embodiments are not limited in this context.

Different memories may offer different memory characteristics, such as latency, throughput, power ratings, memory space, and so forth. A cost factor can be developed as a function of these memory characteristics. For example, assume CRTPi represents the cost of a read by process Pi, and CWTPi represents the cost of read by process Pi, then:

$$CRT_{P_i} = \tfrac{1}{n}[\,] \quad CWT_{P_i} = \tfrac{1}{n}[\,]$$

and therefore, $$T_{CRT} = \sum_i^Q MRT_{P_i} \cdot CRT_{P_i} + \sum_i^Q MWT_{P_i} \cdot CWT_{P_i}$$

which comprises the cost of bandwidth reduction. In this case, the problem becomes choosing a memory map to reduce the total assignment cost (TCRT).

The reduction effort, however, may need to adhere to a set of assignment constraints for a given implementation. In one embodiment, for example, there may be three constraints. The first constraint may be represented as follows:

$$\Sigma_i MRT_{P_i} + \Sigma_i MRT_{P_i} < MB$$

The first constraint may ensure that the allocated memory fits the physical memory. The second constraint may assume D0, D1, . . . Dn comprises the sizes S1, S2, . . . Sn, and may be represented as follows:

$$[S_1 \ldots S_N] \begin{bmatrix} MM_{11} & \ldots \\ \vdots & \\ \ldots & MM_{NN} \end{bmatrix}$$

$$\sum_i S_i MM_i \leq MS$$

where MS=[ . . . ]N represents maximum space in each memory. The third constraint may be represented as follows:

$$L_{1\,NORM}\!\left(\sum_i S_{P_i} MM_{P_i}\right) = L_{1\,NORM}\!\left(\sum_i S_{P_i}\right)$$

The third constraint may ensure that all the data objects are mapped exhaustively which means all memory will be allocated. Thus, the dynamic memory allocation scheme in this example may attempt to reduce TCRT such that constraints {C1, C2, C3} remain true.

It is worthy to note that the this example assumes that all the component costs are additive. When the system is overloaded or saturated, the linear assumptions may not hold true. A system may be designed, however, with a certain amount of excess capacity which may allow the system to operate in the linear region.

The embodiments may be implemented using an architecture that may vary in accordance with any number of factors, such as desired computational rate, power levels, heat tolerances, processing cycle budget, input data rates, output data rates, memory resources, data bus speeds and other performance constraints. For example, one embodiment may be implemented using software executed by a processor, as described previously. In another example, one embodiment may be implemented as dedicated hardware, such as an Application Specific Integrated Circuit (ASIC), Programmable Logic Device (PLD) or DSP and accompanying hardware structures. In yet another example, one embodiment may be implemented by any combination of programmed general-purpose computer components and custom hardware components. The embodiments are not limited in this context.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method, comprising:
retrieving a set of virtual addresses used by an agent;
assigning said virtual addresses to a first set of physical memory addresses;
generating a first assignment cost value comprising a measure of bandwidth for said assignment; and
reassigning said virtual addresses to a second set of physical addresses using said first assignment cost value.

2. The method of claim 1, wherein said first and second sets of physical addresses correspond to a plurality of memory types.

3. The method of claim 2, wherein said generating comprises:
identifying a number of data objects associated with said agent;
receiving a read rate value and a write rate value for said data objects;
mapping each data object to a memory type to form a first memory map;
determining a memory read traffic value using said read rate value and said first memory map, and a write traffic value using said write rate value and said first memory map;

determining a read cost value and a write cost value for said memory types;

determining an assignment read cost value by multiplying said memory read traffic value with said read cost value, and an assignment write cost value by multiplying said memory write traffic value with said write cost value; and generating said first assignment cost value by summing said assignment read cost value with said assignment write cost value.

4. The method of claim 3, wherein determining said read cost value and said write cost value comprises:

identifying at least one cost factor associated with each memory type; and determining said read cost value and said write cost value using said at least one cost factor.

5. The method of claim 3, wherein receiving said read rate value and said write rate value for said data objects comprises:

receiving a read page count value and a write page count value; and generating said read rate value and said write rate value using said read page count value and said write page count value, respectively.

6. The method of claim 3, wherein reassigning said virtual addresses comprises:

generating a second assignment cost value for said second set of physical addresses;

comparing said second assignment cost value with said first assignment cost value; and reassigning said virtual addresses to said second set of physical addresses if said second assignment cost value is lower than said first assignment cost value.

7. The method of claim 6, wherein generating said second assignment cost value comprises:

remapping each data object to a memory type to form a second memory map;

determining said memory read traffic value using said read rate and said second memory map, and said write traffic value using said write rate and said second memory map;

determining said assignment read cost value by multiplying said memory read traffic value with said read cost value, and said assignment write cost value by multiplying said memory write traffic value with said write cost value; and generating said second assignment cost value by summing said assignment read cost value with said assignment write cost value.

8. The method of claim 3, wherein mapping each data object to a memory type to form a first memory map comprises:

determining a set of mapping constraints for said mapping; and mapping each data object to a memory type to form said first memory map in accordance with said mapping constraints.

9. The method of claim 1, wherein said reassigning comprises moving data objects for said agent from said first set of physical addresses to said second set of physical addresses.

10. An apparatus, comprising:

a task management module to retrieve a set of virtual addresses used by an agent;

a memory assignment module to couple to said task manager, said memory assignment module to assign said virtual addresses to a first set of physical memory addresses for a plurality of memory devices; and a memory bandwidth module to couple to said memory assignment module, said memory bandwidth manager module to generate an assignment cost value comprising a measure of bandwidth for said assignment, and reassign said virtual addresses to a second set of physical addresses to lower said assignment cost value.

11. The apparatus of claim 10, further comprising a memory usage module to couple to said memory bandwidth module, said memory usage module to provide memory usage information to said memory bandwidth module to generate said assignment cost values.

12. The apparatus of claim 10, wherein said memory devices comprise internal memory and external memory.

13. The apparatus of claim 10, wherein said memory devices have different latency times, throughput, or power requirements.

14. The apparatus of claim 10, wherein said agent comprises one of a software program and hardware device.

15. A system, comprising:

an antenna;

a processing system to connect to said antenna, said processing system having a processor and a plurality of memory devices; and a memory management module to couple to said processing system, said memory management module to manage assigning a plurality of agents to use a first set of memory devices from said plurality of memory devices based on an assignment cost value comprising a measure of bandwidth for said assignment, and to reassign said plurality of agents to a second set of memory devices from said plurality of memory devices to lower said assignment cost value.

16. The system of claim 15, wherein said processing system further comprises a communication fabric to couple said processor to said memory devices.

17. The system of claim 15, wherein said memory management module comprises:

a task management module to retrieve a set of virtual addresses used by an agent;

a memory assignment module to couple to said task manager, said memory assignment module to assign said virtual addresses to a first set of physical addresses for said plurality of memory devices; and a memory bandwidth module to couple to said memory assignment module, said memory bandwidth module to generate said assignment cost values.

18. The apparatus of claim 16, further comprising a memory usage module to couple to said memory bandwidth module, said memory usage module to provide memory usage information to said memory bandwidth module to generate said assignment cost values.

19. An article comprising:

a storage medium;

said storage medium including stored instructions that, when executed by a processor, are operable to retrieve a set of virtual addresses used by an agent, assign said virtual addresses to a first set of physical memory addresses, generate a first assignment cost value comprising a measure of bandwidth for said assignment, and reassign said virtual addresses to a second set of physical addresses using said first assignment cost value.

20. The article of claim 19, wherein the stored instructions, when executed by a processor, generate said first assignment cost value using stored instructions operable to identify a number of data objects associated with said agent, receive a read rate value and a write rate value for said data objects, map each data object to a memory type to form a first memory map, determine a memory read traffic value using said read rate value and said first memory map, and a write traffic value using said write rate value and said first memory map, determine a read cost value and a write cost value for said memory types, determine an assignment read cost value by multiplying said memory read traffic value with said read cost value, and an assignment write cost value by multiplying said memory write traffic value with said write cost value, and generate said first assignment cost value by summing said assignment read cost value with said assignment write cost value.

21. The article of claim 20, wherein the stored instructions, when executed by a processor, reassign said virtual addresses using stored instructions operable to generate a second assignment cost value for said second set of physical addresses, compare said second assignment cost value with said first assignment cost value, and reassign said virtual addresses to said second set of physical addresses if said second assignment cost value is lower than said first assignment cost value.

22. The article of claim 21, wherein the stored instructions, when executed by a processor, generate said second assignment cost value using stored instructions to remap each data object to a memory type to form a second memory map, determine said memory read traffic value using said read rate and said second memory map, and said write traffic value using said write rate and said second memory map, determine said assignment read cost value by multiplying said memory read traffic value with said read cost value, and said assignment write cost value by multiplying said memory write traffic value with said write cost value, and generate said second assignment cost value by summing said assignment read cost value with said assignment write cost value.

* * * * *

UNITED STATES PATENT AND TRADEMARK OFFICE
CERTIFICATE OF CORRECTION

PATENT NO.         : 7,159,096 B2
APPLICATION NO. : 10/816268
DATED              : January 2, 2007
INVENTOR(S)        : Moinul H. Khan et al.

It is certified that error appears in the above-identified patent and that said Letters Patent is hereby corrected as shown below:

Column 9, Line 6      Delete Second "(MRT)" and insert -- (MRW) --
Column 10, Line 13    Delete "the" after "that"

Signed and Sealed this

Twenty-fifth Day of December, 2007

JON W. DUDAS
*Director of the United States Patent and Trademark Office*